Dec. 15, 1936.  M. O. TEETOR  2,064,576
PISTON RING STRUCTURE
Filed Sept. 23, 1935
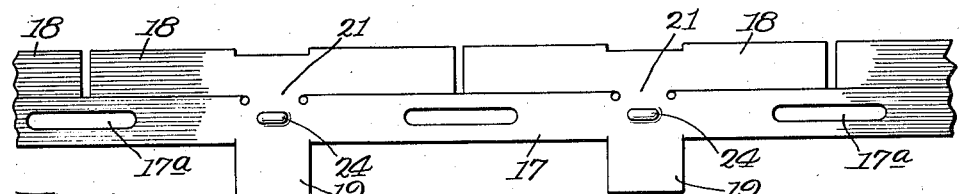
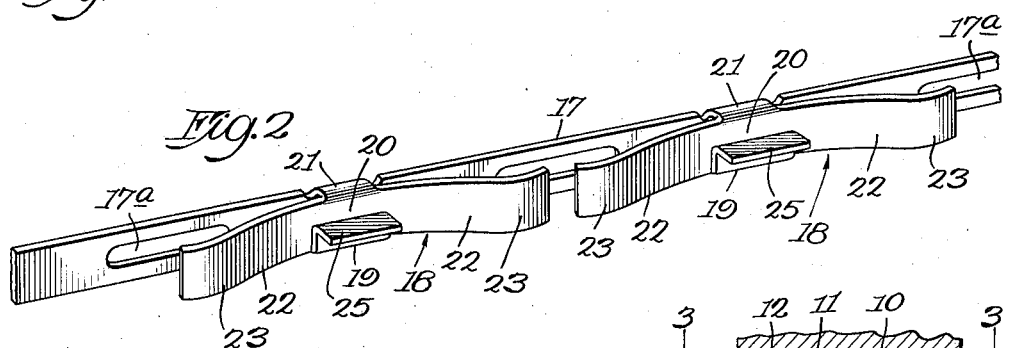
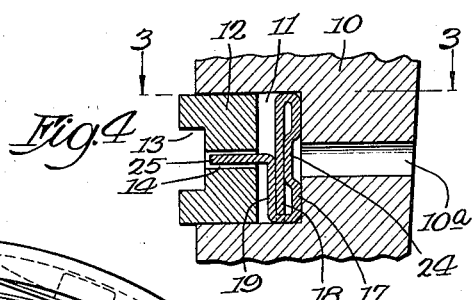
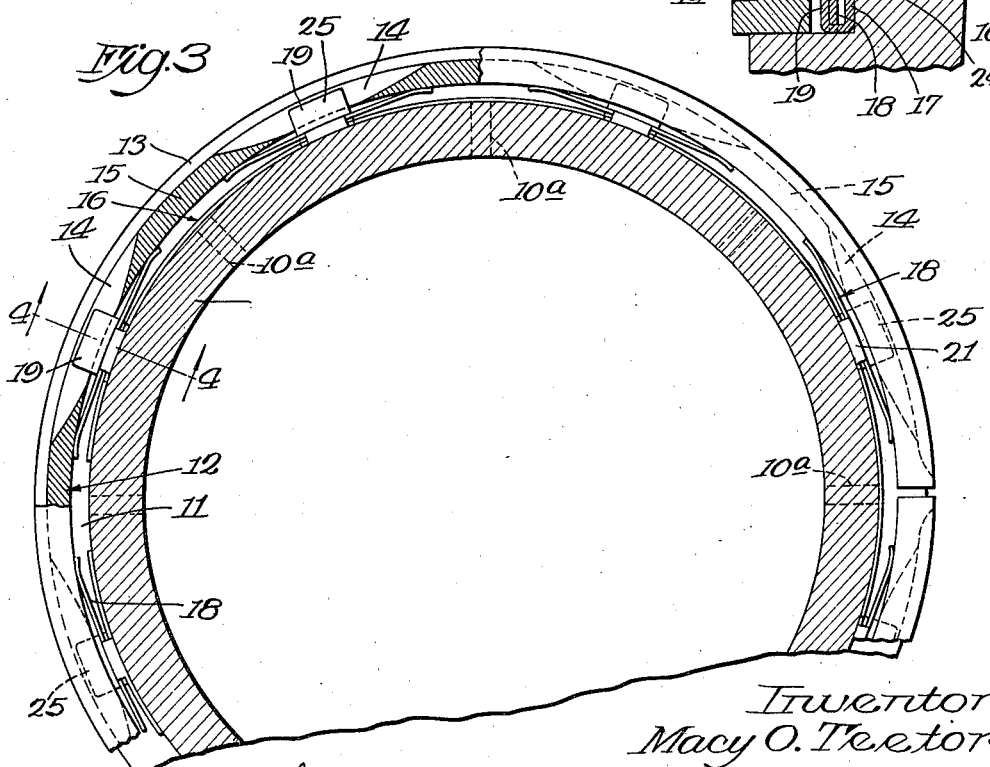
Inventor:
Macy O. Teetor
By Davis, Macauley, May, Lindsey & Smith  Attys.

Patented Dec. 15, 1936

2,064,576

UNITED STATES PATENT OFFICE 2,064,576

PISTON RING STRUCTURE

Macy O. Teetor, Newcastle, Ind., assignor to The Perfect Circle Company, Hagerstown, Ind., a corporation of Indiana Application September 23, 1935, Serial No. 41,709

9 Claims. (Cl. 309—43)

My invention relates to piston ring structure, and has to do particularly with structure of that character employing a piston ring expander for use in connection with and adapted to augment the expanding action of a piston ring for internal combustion engines and the like.

One of the objects of my invention is to provide an improved structure of the foregoing character which is of simple construction and which is highly efficient in operation.

Another object is to provide improved means for preventing relative rotation between piston ring expanding means and the piston ring.

Still another object is to provide piston ring expanding means particularly adapted for use with so-called ventilated or slotted oil rings, the expanding means being adapted to improve the pressure characteristics of the ring, and also its oil control characteristics by minimizing the tendency for carbon to form in the ring slots.

A more specific object is to provide a piston ring expander suited for the foregoing purposes and embodying a supporting band adapted to be mounted in the piston ring groove, which band carries a plurality of spaced spring members adapted to expandingly engage the piston ring intermediate the ends of the ring slots, and which also embodies elements adapted to enter the ring slots to prevent relative rotation between the expander and the ring and maintain the expander spring members seated against full section inner surfaces of the ring.

Other objects and advantages will become apparent as this description progresses and by reference to the drawing wherein,—

Figure 1 is this plan view of a portion of a blank that may be used in making one form of piston ring expander embodying this invention;

Fig. 2 is a fragmental perspective view of a portion of an expander formed from the blank of Fig. 1;

Fig. 3 is a plan sectional view of a piston showing the expander in position behind the piston ring, the section being taken substantially on line 3—3 of Fig. 4; and Fig. 4 is an enlarged sectional elevation taken substantially at the position indicated by line 4—4 of Fig. 3.

In the drawing I have shown my invention as applied to a piston 10 having a ring groove 11 which is adapted to receive an oil ring 12 of the so-called ventilated or slotted type. The ring 12 is provided with a groove 13 in its outer surface and also radial slots 14 extending from the groove 13 through to its inner surface (Fig. 3).

The slots are separated by bridge portions 15, the opposite ends of which are tapered so that the end walls of the slots 14 converge toward the inner surface of the ring. The piston is provided with the usual holes 10ª through which the excess oil, which passes through the slots 14, drains back into the crank case of the engine.

A piston ring expander 16 is mounted in the ring groove 11 behind the ring, and this expander is, preferably, formed from a blank of soft steel of the form illustrated in Fig. 1. More particularly, the blank of Fig. 1 is cut so as to provide a supporting band 17, a plurality of spring members 18 and a plurality of stop elements 19. The supporting band 17 is of a length slightly less than the circumference of the bottom of the ring groove 11, and the spring members 18 are, preferably, of substantially the same width as the supporting band. The spring members 18, providing spring arms 22, are connected to the supporting band by necks 21. The outer ends of the spring arms 22 are curved or bent so that ring contacting points 23 are provided adjacent the ends of the spring arms avoiding the likelihood of the sharp ends of the spring arms digging into the piston ring.

In forming the expander, the spring member portions 18 are turned over and upon the supporting band 17 so that the spring arms 22 overlie such band in spaced and substantially parallel relation with respect thereto. The intermediate part of each spring portion is held spaced with respect to the supporting band by an embossment 24 formed in the band. After the spring members 18 are turned over upon the band 17, the portions constituting the stop elements 19 are bent upwardly so as to overlie the outer face of the intermediate part 20 of the spring members, and the free edges of the stop elements are then turned outwardly away from the spring member to provide stop lugs 25 as clearly shown in Fig. 2. After the expander is formed, it is heat-treated and tempered so that it becomes hard and resilient and it has the characteristics of spring steel. The band 17 is provided with spaced slots 17ª to permit the excess oil to drain through the holes 10ª in the piston.

In assembling the ring and expander in the piston ring groove, the stop lugs 25 of the several spring members are projected through the inner portions of the ring slots 14 thereby tending to prevent rotation between the expander and the ring. The width of the stop lugs 24 is slightly less than the length of the slots 14 to insure proper flexing action of the spring arms and piston ring under all operating conditions. In the use of an expander of this character with the slotted type of ring, it is highly desirable that the ring contacting points 23 of the spring arms 22 be located so that these points do not engage the inner surface of the ring at the slots 14, as wear would be excessive. The stop lugs 25 insure the positioning of the spring members so that the ring-engaging points 23 of the spring arms always contact the inner surface of the ring between the ends of the slots 14, that is to say, upon the full-section portions of the ring. I have also found that, in providing stop means projecting into the slots 14, as described, the oil control functions of the ring are improved due to the ability of the stop lugs 24 to minimize the formation of carbon within the slots. That is to say, in the operation of the piston, the ring 12 will tend to rotate thereon and it will also expand and collapse thereby apparently causing a combined oscillating, expanding and contracting movement of the slotted surfaces of the piston relative to the stop lugs 25 of the expander. This action will tend to cause the stop lugs 25 to keep the ring slots 14 clear without affecting their oil control functions.

I believe that the operation and advantages of my invention will be well understood from the foregoing; and it is to be understood that, although I have described only one form of structure embodying my invention, other changes in details and arrangement of parts may be resorted to without departing from the spirit and scope of my invention as defined by the claims that follow.

I claim:

1. In structure of the class described, the combination of a piston ring having circumferentially-spaced slots extending radially therethrough, and expanding means which includes a supporting band adapted to be seated in the ring groove behind said ring, spring members carried by said band and having spring arms engaging the inner surface of said ring, and lugs carried by said band and entering the inner portions of said slots for positioning said spring arms relative to said slots and for holding said ring and expanding means against relative rotation.

2. In structure of the class described, the combination of a piston ring having circumferentially-spaced slots extending radially therethrough, and expanding means which includes a supporting band adapted to be seated in the ring groove behind said ring, spring members carried by said band and having spring arms, said spring arms being longer than said slots and having end portions adapted to engage the inner surface of said ring beyond the ends of said slots, and lugs carried by said band and extending into said slots for holding said ring and expanding means against relative rotation and for keeping said slots free from carbon or other deposits.

3. In structure of the class described, the combination of a ring having circumferentially-spaced slots extending therethrough from its outer to its inner surface, the ends of said slots being separated by bridge portions, and expanding means which includes a supporting band adapted to be mounted in the ring groove behind said ring, a plurality of spring members each having a pair of spring arms extending in opposite directions and overlying said band in spaced relation, the total length of said pair of spring arms being greater than the inner portion of said slots so that the ends of said arms engage said ring bridge portions beyond the ends of said slots, and means engaging said ring slots and holding the ring and expanding means against relative movement.

4. A piston ring expander formed of a single integral piece of metal comprising a supporting band, spring members having spring arms overlying said band in spaced relation, and stop elements associated with said spring members in overlying relation to the latter.

5. A piston ring expander formed of a single integral piece of metal comprising a supporting band, spring members, each spring member including an intermediate portion connected to said band, and spring arms carried by said intermediate portion and extending in opposite directions in overlying relation to said band, and a ring-engaging element overlying said intermediate portion and having an end part extending away from said intermediate portion toward the ring.

6. A piston ring expander comprising a supporting band, a plurality of spring members carried by said band and having spring arms overlying said band in spaced relation thereto, and stop elements carried by said band in overlying relation to said spring members and each having a part projecting outwardly from its respective spring member and adapted to engage the inner surface of a ring to hold the expander against rotation relative to the ring.

7. A piston ring expander comprising a supporting band, a plurality of spring members carried by said band, each said spring member having an intermediate portion connected to the upper edge of said band and spring arms carried by said intermediate portion and extending in opposite directions in overlying relation to the outer face of said band, and a stop element carried by the lower edge of said band adjacent at least one of said intermediate portions and extending upwardly and overlying said intermediate portion with an end part projected away from said spring member to engage the piston ring.

8. The combination of a piston ring and a ring expander structure adapted to be placed in the perforated groove of a piston, the ring having an oil drain slot extending therethrough, and the ring expander structure having a supporting part fitted in the ring groove means on the supporting part independently tending to expand the piston ring, and a projection extending into said oil drain slot for keeping the latter free of carbon and preventing relative rotation between the ring and the expander structure.

9. In structure of the class described, the combination of a piston having a ring groove therein, a piston ring mounted in said groove and having spaced drain openings extending therethrough, and a ring expander structure mounted in said groove behind said ring and having projections engaging said ring openings and other spring projections engaging the inner face of said ring to expand the latter.

MACY O. TEETOR.